United States Patent [19]

Trottmann

[11] Patent Number: 4,494,276
[45] Date of Patent: Jan. 22, 1985

[54] FEEDING MACHINE AND RECEIVING DEVICE FOR APPORTIONED SAUSAGE CHAINS

[75] Inventor: Bruno Trottmann, Gossau, Switzerland

[73] Assignee: C. Hoegger & Cie. AG, Gossau, Switzerland

[21] Appl. No.: 354,675

[22] Filed: Mar. 4, 1982

[30] Foreign Application Priority Data

Mar. 5, 1981 [CH] Switzerland ............ 1482/81

[51] Int. Cl.³ .................................... A22C 15/00
[52] U.S. Cl. ............................... 17/1 F; 17/33; 17/44.4; 226/105
[58] Field of Search .............. 17/33, 34, 1 F, 1 R, 17/44.4; 226/105

[56] References Cited

U.S. PATENT DOCUMENTS

| | | | |
|---|---|---|---|
| 2,674,004 | 4/1954 | Cross | 17/34 |
| 2,697,850 | 12/1954 | Cross | 17/34 |
| 3,204,844 | 9/1965 | Wallace | 226/104 |
| 3,964,129 | 6/1976 | Townsend | 17/34 X |
| 4,091,505 | 5/1978 | Müller et al. | 17/1 F X |
| 4,218,003 | 8/1980 | Plewa et al. | 226/105 X |

Primary Examiner—Willie G. Abercrombie
Attorney, Agent, or Firm—Sughrue, Mion, Zinn, Macpeak and Seas

[57] ABSTRACT

A feeding machine 1 has a sausage conveying device 5 with a feeding arm 6 which moves in a conically circular manner around a smoking rod 7. Endless conveyer belts 8, 9, 19 are arranged in the device 5 between which the sausage chains 3 are transported from the rear to the front. The smoking rod 7 is clamped in a receiving device 2 in a longitudinally movable way and is located in the center axis of a cone determined by the circular movement. The receiving device 2 and the feeding machine 1 are connected with each other such that the conically circular movement of the feeding arm and the longitudinal movement of the smoking rod can be adjusted relative to each other. Depending on the rotational velocity of the conically circular movement or the withdrawal velocity of the smoking rod, larger or smaller loops develop at different distances.

18 Claims, 12 Drawing Figures

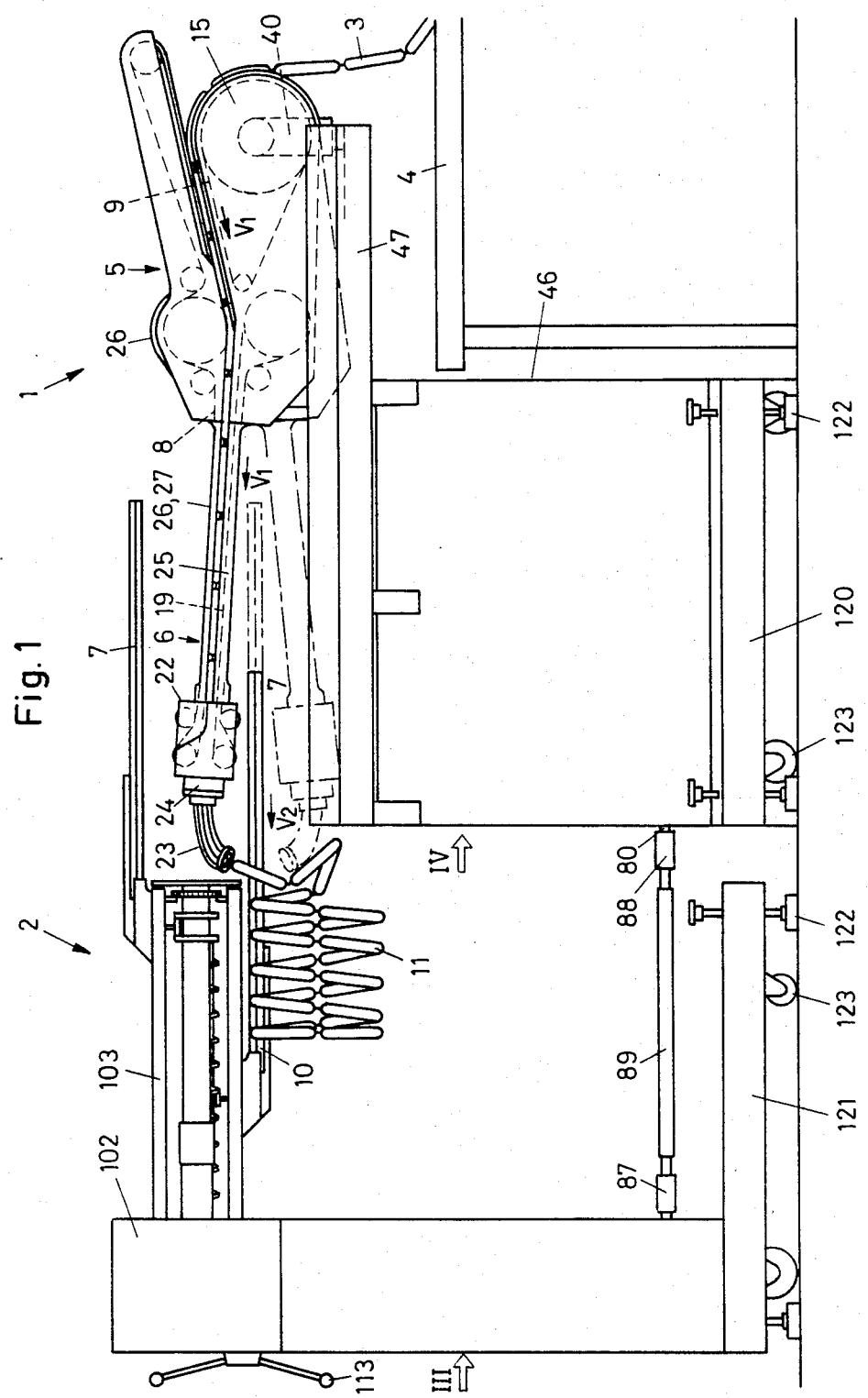

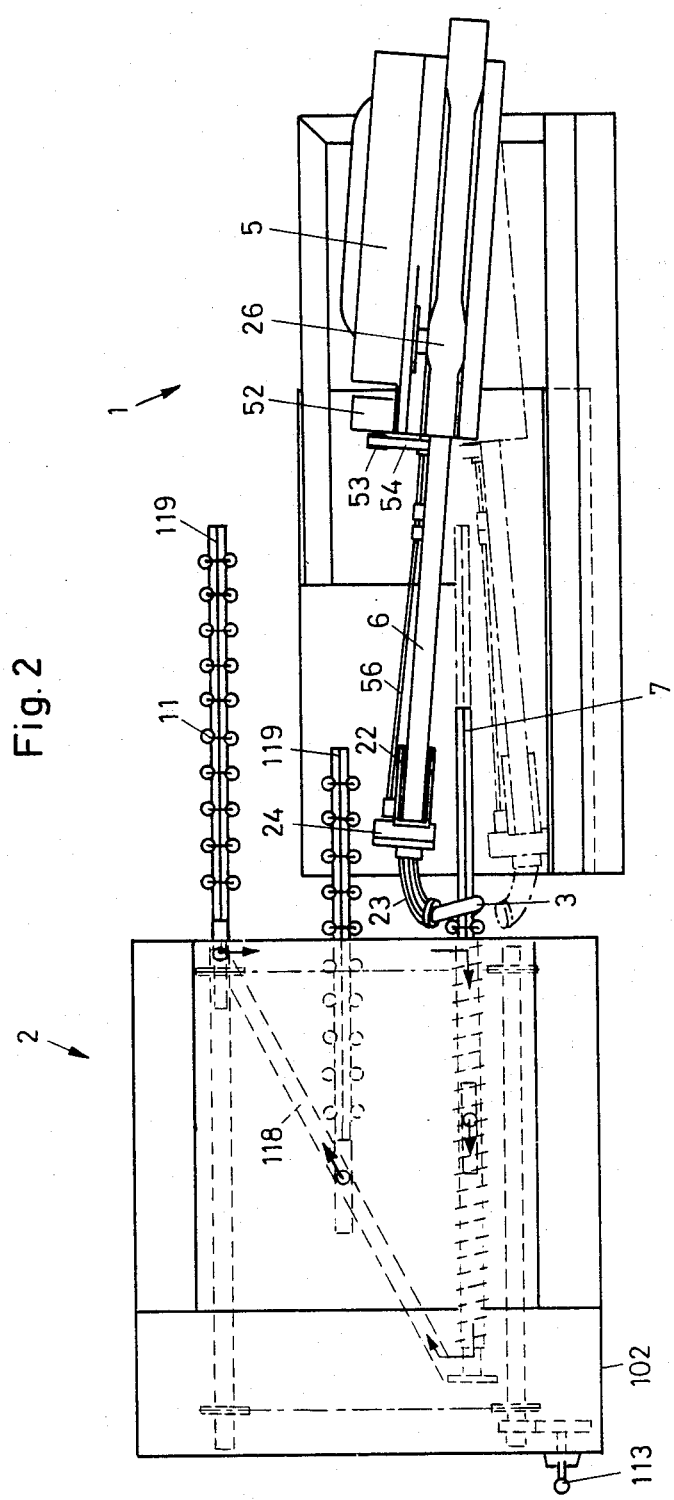

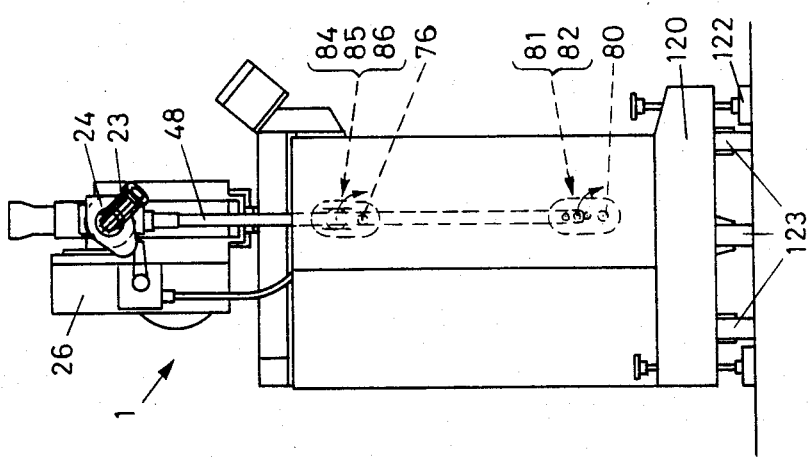
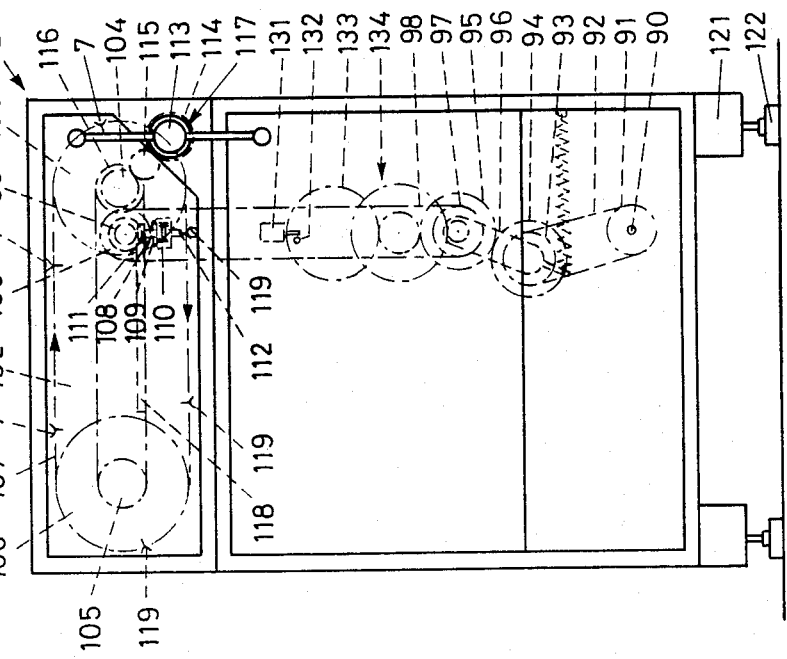

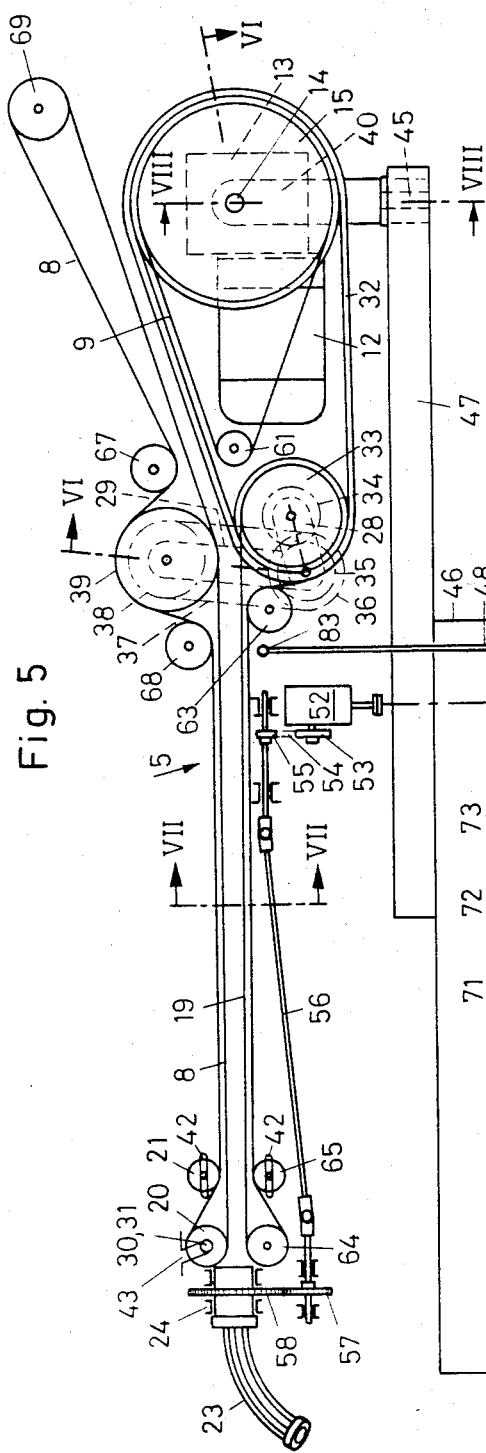
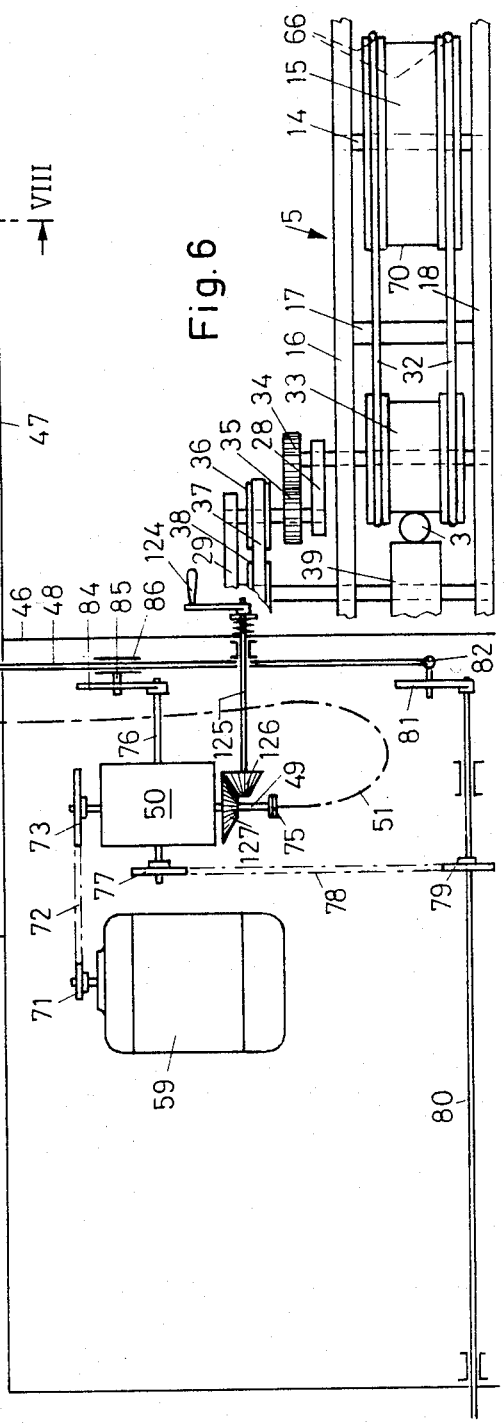

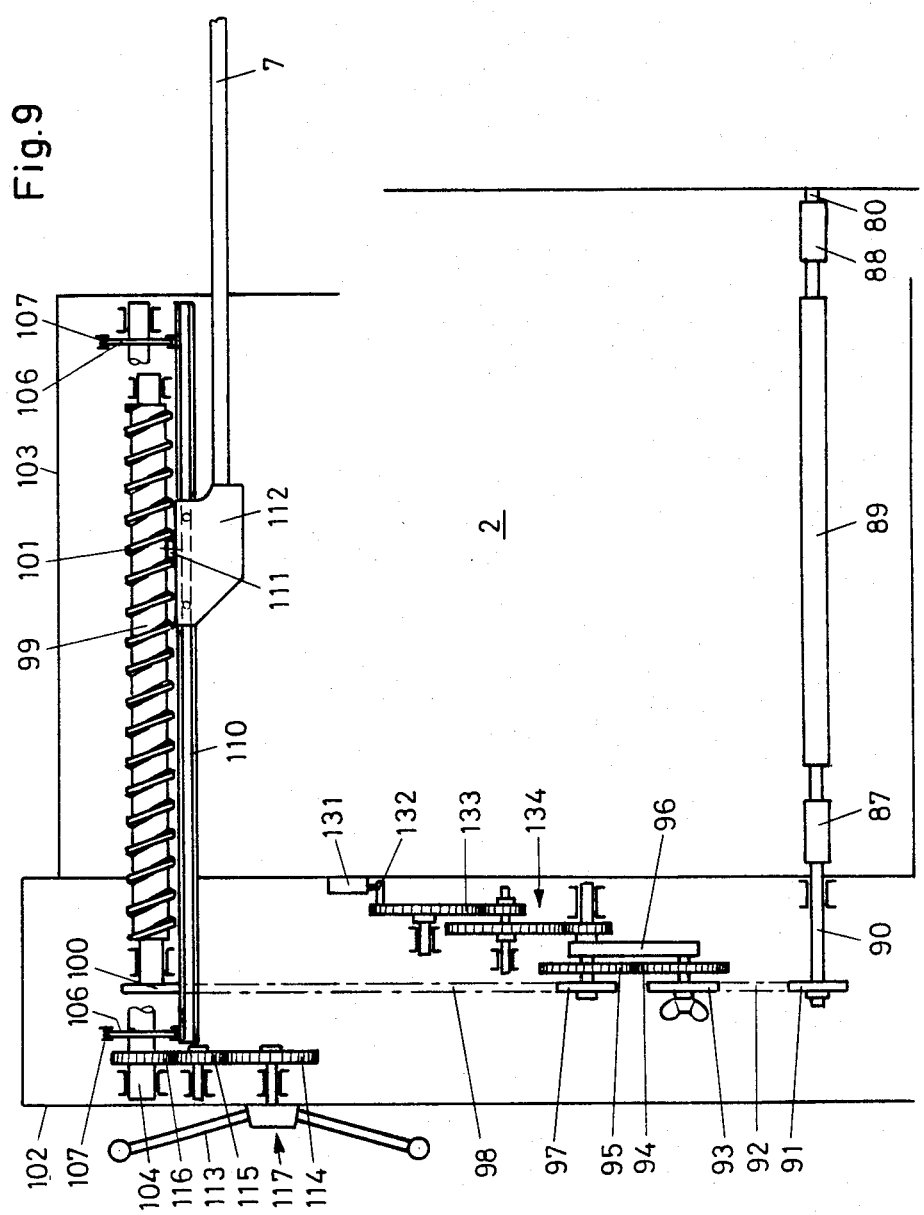

FEEDING MACHINE AND RECEIVING DEVICE FOR APPORTIONED SAUSAGE CHAINS

DESCRIPTION

Background of the Invention

The invention concerns a feeding machine and receiving device for apportioned sausage chains.

A sausage filling machine is known from the German Disclosure Publication No. 26 19 296 with which a sausage line continuously leaving the machine and divided into uniform portions is suspended on the hooks of a conveying system. The hooks are arranged on a rotating conveyor chain and engage successively into the sausage line whereby the action cycle is adjusted to the discharge velocity of the sausage machine.

In the conveying system according to the German Disclosure Publication No. 26 19 296, a roller chain is provided with projecting fingers to receive the sausage line. The sausage line which is divided by means of a guide element swiveling back and forth is alternately suspended over the roller chain so that a certain number of sausages form a garland on the left and on the right.

The known suspension and conveying systems are disadvantageous from different points of view. The hooks or fingers arranged on the chains always have the same distance which cannot be changed in an easy way. No matter whether large or small sausages are produced, the same space is always required on the conveying system. For the purpose of smoking, the sausages must be lined up on a smoking rod. This is done in such a way that a person introduces the smoking rod into the loops of the garlands and then lifts the sausages off the hooks. The distance between the sausages is now equal to that between the hooks on the conveying chain. In order to be able to utilize the space available in the smoking chamber to a maximum, thin sausages must be manually pushed together on the smoking rod which is labor-intensive and leads to irregular distances.

An alternative could consist of exchanging, in case of thin sausages, the chains with the hooks for another chain whose distances between the hooks are smaller. However, this would only be worthwhile in case of high numbers since the changing of the chain is labor-intensive and the synchronization of the conveyor belt with the discharge cycle of the sausage machine would have to be changed.

The known device is also, in particular, not suitable for natural sausage skins which are of different lengths and are less stiff than artificial sausage skins and, therefore, cannot be pushed.

German Pat. No. 2 744 350 also forms part of the state of the art. The suspension device described in this patent has a rotating endless roller chain from which hooks project at regular intervals for the apportioned sausage line. The feeding device consists of a wheel in the circumference of which a groove is arranged into which the sausage line is placed. An endless belt is led over rollers pushes the sausage line softly into the groove over a part of the roller circumference. In this way, the sausage line is guided smoothly, which is an essential advantage in comparison with the pushing since less stiff natural skins can now be used. However, the endless chain with the hooks still constitutes a disadvantage. Also in this instance, the smoking rod must be pushed into the sausage loops by an employees so that they can be lifted off and placed on a transfer car in order to transport then into the smoking chamber.

Finally, German Disclosure Publication No. 26 10 315 presents additional conveying systems for sausage chains. In one of these designs, a worm conveyor replaces the chain with hooks. In practice, this design proved not to be adequate because sausages with thin skins or even small sausages cannot be transported since there is too much slip between the skin and the worm conveyor.

Another design of the conveying system operates with a rotating conveying shaft whose end is bent and handles the sausage line in an action cycle. The sausage loops are transported by means of the projecting fingers of an endless chain. Also in this instance, the lining-up of the sausage loops on the smoking rods is effected in an operation of its own.

SUMMARY OF THE INVENTION

The present invention has the task of creating a feeding machine and receiving device for apportioned sausage chains in which the sausage line is directly lined up on the smoking rod in the form of loops without using complex chains, hooks and other additional accessories. The invention has the following advantages:

A considerable operational rationalization is achieved. The sausages reach the smoking rods directly from the sausage producing machine or through an intermediate station. There is no supplemental manual handling of the sausages in order to get them from a suspension system to the smoking rods. Furthermore, the device is not bound to a certain sausage producing machine.

The distance between the sausage loops on the smoking rods can be changed using simple means so that the optimum distance can be selected for thick as well as thin sausages. The space in the smoking chamber is always fully utilized.

The system permits the processing of hard sausage chains with artificial skins as well as of soft sausage chains with natural skins. In this context, it is smoothly adjustable to different kinds of sausages and sausage dimensions.

An exemplified embodiment of the invention is further explained below with the help of the drawings, wherein:

FIG. 1 is a lateral view of the feeding machine and receiving device for apportioned sausage chains;

FIG. 2 is a top view on the machine and the device according to FIG. 1;

FIG. 3 is a front view of the receiving device according to the arrow III of FIG. 1;

FIG. 4 is a front view of the feeding machine according to the arrow IV of FIG. 1;

FIG. 5 is a schematic longitudinal cross-section through the feeding machine;

FIG. 6 is a schematic cross-section according to the line VI'VI through the feeding machine according to FIG. 5;

FIG. 9 is a schematic longitudinal cross-section through the receiving device.

DETAILED DESCRIPTION OF THE PREFERRED EMBODIMENTS

Figure 7:
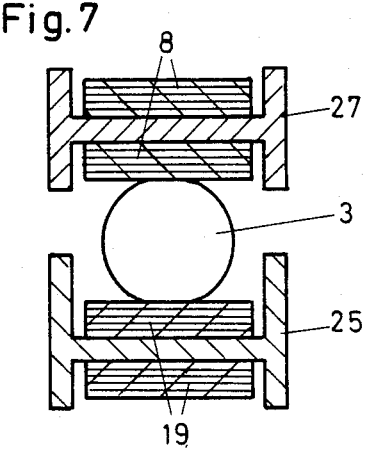
FIG. 7 is a cross-section VII—VII according to FIG. 5.
Figure 8:
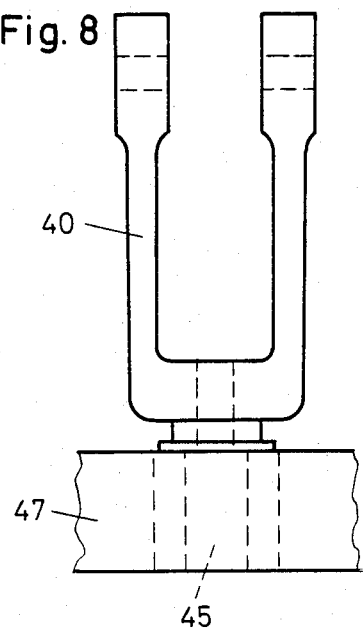
FIG. 8 is a schematic cross-section VIII—VIII according to FIG. 5.

In the embodiment of the invention shown in the drawings, the feeding machine is identified by 1 and receiving device by 2.

A sausage chain 3 continuously leaving a sausage filling machine, which is not shown in detail, and being divided into regular portions reaches a table 4. It is taken from there and manually placed into a sausage conveying device 5 which forms part of the feeding machine 1. The conveying device 5 has one upper conveyor belt 8 end two lower conveyor belts 9, 19 as well as a feeding arm 6 which rotates around the smoking rod 7. The smoking rod 7 is fastened to the receiving device 2 by means of a clamped holding system.

The sausage chain 3 which was introduced into the conveying system 5 at its rear, held between the upper and lower conveyor belts 8; 9, 19 and transported forward by them in the feeding arm 6, reaches the wire basket elbow 23 with a velocity of $V_1$, which corresponds to the belt velocity, and passes from there to the clamping end 10 of the smoking rod 7. The latter is now slowly withdrawn with the velocity $V_2$. By adjusting the velocities $V_1$ and $V_2$ towards each other, the desired type of suspension is obtained.

When, for example, the belt velocity $V_1$ is high, long sausages loops 11 are obtained while the loops 11 are short with a low belt velocity $V_1$. With high withdrawal velocities $V_2$ of the smoking rod, the distances between the loops are large while the distances become small with a low $V_2$.

The drive of the sausage conveying device 5 is effected by means of an adjustable motor 12 which is flanged to the worm gear 13. The worm gear 13 drives the main roller 15 through the extended power take-off shaft. The worm gear 13 is screwed to the lateral bearing bracket 16 of the conveying device 5. This bearing bracket 16 is connected with the adjacent bearing bracket 18 on the other side by means of spacers 17. The two lower conveyer belts 9, 19 with their support rollers and guide tension rollers are located between the two bearing brackets 16, 18.

The chamber 22 arranged at the transfer end of the feeding arm 6 carries guide and tension rollers for the lower conveyor belt 19 and the upper conveyor belt 8. Furthermore, the bearing 24 is arranged in the chamber 22 for the wire basket elbow 23. Two double T sections 25, 27 are provided as slide rails for the conveyer belts 8, 19. These sections must be as small as possible so that the rotating radius does not become too large. The conveyer belt slides on each section 5, 27 on the crosspiece between the two T shanks and the advance is underneath and the return above with respect to the upper section 27 while it is reversed with regard to the lower section 25. The lateral guiding is effected by the shanks. The upper conveyer belt 8 is accomodated in a separate casing 26, together with the upper double T section 27 and additional guide and tension rollers. The casing 26 is fastened in an articulated way on the lower part of the conveying device 5 by means of the connecting lever 29 and the rocker 28 and can be swiveled around the center of the rotation 30.

The lower rear conveyer belt 9 runs in the feeding part of the conveying device 5 over the main driver roller 15 and the tension and guide roller 61. The second lower conveyor belt 19 is arranged in the feeding arm 6 and runs over the driving roller 33, the guide rollers 63 as well as the two guide and tensions rollers 64 and 65 in the chamber 22. It is guided in the lower U section rail 25 which connects the feeding arm 6 with the chamber 22.

The upper belt 8 is driven by the driving roller 39 which is located in the upper casing 26 of the conveying device 5. It runs over the two guide rollers 67, 68 which are arrranged adjacent to the driving roller 39. In the rear, it is placed over the guide roller 69 and, in the front, over the guide and tension rollers 20 and 21 in the chamber 22. In the feeding arms 6, it is guided by means of the upper sectional rail 27. Accordingly, the upper conveyer belt 8 extends over the entire length of the conveying device 5.

The guide and tension rollers 20, 64 or 21, 65 in the discharge end of the feeding arm 6 are supported in the lateral walls of the chamber 22 whereby the axes of the tension rollers 21, 65 are arranged in two longitudinally running slots 42. The axis 31 of the upper rear guide roller 20 for the upper conveyer belt 8 is also arranged in a slot 43 which is essentially directed vertically to the belt 8. The axis 31 can be loosened by means of winged screws and moved within the slot 43. In this way, the distance between the upper 8 and the lower 19 conveyer belts can be adjusted to accommodate different sausage thicknesses. A stop which cannot be seen in the drawing maintains the set position. The upper belt 8 can also be shifted upward or downward by shifting the axis 31 and can also be swiveled around the axis 31. These possibilities of movement (changing of the distance, swiveling of the upper part 26 of the conveying device around the center of rotation 30 in the transfer end) serve different purposes. They simplify the introduction of the sausages, serve cleaning purposes, determine the contact pressure to carry along the saugages and serve to adjust to the sausage thickness.

The main driving shaft 14 is, at the same time, the center of rotation and support for the swivel or circular movement of the conveying device 5 as a whole. The latter is suspended in the fork 40 and supported by it. The fork 40 itself rests on an arm 47 of the machine column 46, which projects forward, and it has a vertical axis of rotation 45. The conveying device 5 is supported and conicaly driven to drape the sausage chain 3 around the smoking rod 7 by a connecting rod 48 whose upper end is spherically journaled at 83 to the feeding arm 6.

The wire basket elbow 23 fulfills two functions:

It leads off the sausage chain 3 at the outlet from the conveyer belts in such a way that it impinges transversely to the smoking rod 7 so that the placing of the sausage into the constricting points is facilitated. In this way, a longitudinal pulling of the sausage chain can be avoided.

When swiveling around its own axis, the diameter of the circuit of the end of the feeding arm can be adjusted. With short sausage loops being suspended, a small diameter is chosen. For structural reasons, this amounts to a minimum of about 200 mm. Furthermore, the wire basket elbow 23 serves also to maintain an exact position during start-up. One elbow rotation takes place with each feeding arm rotation.

The drive of the wire basket elbow 23 is effected through the gearing 50. The gearing 50 has a continuous driving shaft 49 which is connected with a flexible driving shaft 51. A small gearing 52 of the same design and transmission is driven by the latter. The drive as from the driving shaft 49 is at a high speed and, therefore, of advantage for the flexible shaft 51 which has a small diameter.

The toothed belt pulley 53 of the gearing 52 drives the toothed belt 54 which engages into the toothed belt pulley 55 located on the universal-joint shaft 56 which is installed in the swivel arm 6. The toothed wheel 57 at the chamber 22 is driven through the universal-joint shaft 56 and said toothed wheel 56 engages into the toothed wheel 58 on which the wire basket elbow 23 is fastened. Further details can be taken from the drawings concerning the drive.

Instead of the elbow 23, a rigid baffle could be arranged above the smoking rod. The sausage chain being discharged at the end of the feeding arm would be guided downward by the baffle and suspended on the smoking rod.

The drive of the upper and of the rear lower belt 8 or 9 is effected by means of two round driving belts 32 coming from the main driving roller 15. The two round driving belts 32 connect the main driving roller 15 with the driving roller 33 for the lower conveyer belt 19. They are placed into lateral grooves 66 on both sides of the deepended groove 70 for the conveyer belts in the two rollers 15, 33 and, besides their driving function, they serve also as a lateral guide and a surface for the hand when introducing the sausage chain into the sausage conveying device.

The rotation of the roller 33 is transferred to the toothed belt pulley 36 by means of the two toothed wheels 34, 35 and, from there, to the toothed belt pulley 38, which is connected with the roller 39, by means of a toothed belt 37.

The continuously varible motor 59 drives, on the one hand, the crank drive for the conically circular movement of the feeding arm 6 and serves, on the other hand, also to drive the conveyer worm for the smoking rod advance.

The motor 59 is connected with the toothed belt pulley 73 located on the gear shaft 49 of the gearing 30 through the toothed belt pulley 71 and the toothed belt 72. The gear shaft 49 is designed as a continuous driving and power take-off shaft whereby the power take-off side is connected with a flexible shaft 51 through a coupling 75 for the wire basket drive as has already been mentioned above.

A second power take-off shaft 76 is driven through a worm in the gearing 50 which is not shown in detail. A toothed belt pulley 77 is placed on it which drives the connecting shaft 80 through a toothed belt 78 and an additional toothed belt pulley 79.

A crank disk 81 is located on the shaft 80 into which a crosshead 82 is inserted in a rotary manner. Different bearing boreholes are provided in the crank disk 81 so that the lift of the connecting rod 48 or the conically circular movement of the swivel arm 6 can be changed by moving the cross head 82 in order to adjust to the smoking rod shape and the sausage size.

The lower end of the connecting rod 48 is fastened to the crosshead 82. A spherical, multi-angular join 83 at the other end of the connecting rod 48 produces the connection with the feeding arm 6.

An additional crank disk 84, having the same deisgn as the disk 81, is located on the second power take-off shaft 76 of the worm gearing 50. A crosshead 85 pivoted in the second crank disc 84 has a U-shaped, open guide groove 86 in which the connecting rod 48 rests in a movable manner and is guided in such a way that it cannot give way laterally.

The connecting rod 48 moves in a vertical plane. Owing to the two crank 81, 84, the joint 83 performs, at least approximately, a circle.

The drive of the conveyer worm 99 for the smoking rod advance is also effected by the shaft 80 which is connected with a universal-joint shaft 89 through a coupling part 88 and said shaft 89 is, in its turn, connected with a shaft 90 in the inside of the machine column of the receiving device 2 through a coupling part 87. A toothed belt pulley 91 which is engaged with an exchangeable toothed belt pulley 93 through a toothed belt 92, is located on the shaft 90. The rotary movement is passed on to a toothed belt pulley 97 through the two meshed toothed pulleys 94, 95 resting in a rocker 96 and said toothed belt pulley 97 is engaged with the toothed pulley 100 located on the end of the conveyer worm 99 through a toothed belt 98.

The rocker 96 and the two toothed pulley 94, 95 are necessary so that the toothed belt pulley 93 can be replaced without having to replace the toothed belt 92 at the same time.

One end of the conveyer worm 99 provided with an auger 101 is supported in the column 102 of the receiving device 2 while the other end rests in the front wall of storage chamber 103 projecting from the column. Rotary tubes 104, 105 rest on both sides of this storage chamber 103 the ends of which carry chain wheels 106. Two parallel roller chains 107 each having 120 links are placed over these chain wheels. Always after twenty links, they have a cam 108 with a carrier 109.

Six slide rails 110 are fastened on the carriers 109 on which one rod holder 112 each rests in a movable fashion into which a smoking rod 7 can be inserted. Each rod holder 112 carries a roller 111 on top which engages into the auger 101 of the conveyer worm 99.

The slide rails 110 are moved by handwheels 113. This is arranged outside on the column 102 and connected with one of the hollow shafts 104 through three toothed wheels 114, 115, 116. By giving the switching device 117 half a turn on the handwheel 113, the roller chain with the cams 108 advances by one action cycle corresponding to 20 chain links whereby an empty smoking rod 7 is placed into an operating position and a fully smoking rod 119 is advanced.

In this instancce, the roller 111 enters the conveyer worm 99 laterally. The switching process is carried out while the conveyer worm 99 is at a standstill. When standing still, the conveyer worm is always in the same positon so that the entering into the conveyer worm is possible without causing any problems. Instead of the manual switching process, it would also be possible to automate this operation.

The empty smoking rod 7 is in a totally extended position so that its inner end is adjacent to the wire basket elbow 23. Since the conical drive of the swivel arm 6 is synchronized with the drive of the conveyer worm 99, the smoking rod is now continuously withdrawn while the sausage loops are formed by the wire basket elbow.

As soon as the smoking rod is fully loaded with sausage loops, the chain 107 is advanced by switching. In this instance, the roller 111 is detached from the augers 101 and engages a diagonal guide roll 118. With the advance movement of the chain, the rod holder 112 is extended again owing to the inclined gliding surfaces so that now the loaded smoking rod 119 can be easily removed from the receiving device 2 by the operating personnel.

Instead of the full smoking rod 119, an empty smoking rod 7 is inserted into the rod holder 112. The empty, projecting smoking rods 7 are above the loaded smoking rods 119. They are transported back to the loading position on a step-by-step basis by means of the rotating chain.

The feeding machine 1 as well as the receiving device 2 each have a machine base column 120, 121. This has the advantage of a light weight construction and of a good transportability. The base columns are provided with foot supports 122 of rubber, and the wheels 123 are slightly lifted off the ground during operation.

A disconnectable bandwheel 124 is arranged in the column 120 of the feeding machine 2. The motion developed by the swivel arm/wire basket/smoking rod withdrawal can be adjusted, for example, after the machine has been moved, by means of this handwheel whose axis 125 carries a bevel gear 126 which engages into a bevel gear 127 on the power take-off shaft 49.

Figure 10:
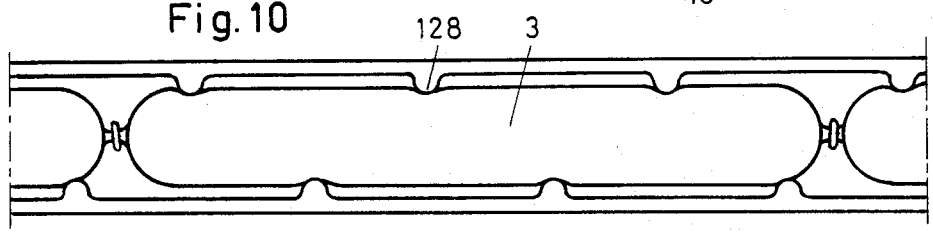
FIGS. 10, 11 and 12 show different alternatives for the design of the conveyer belts.
Figure 11:
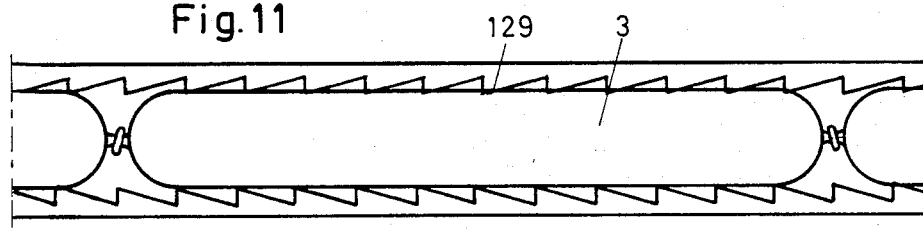
Figure 12:
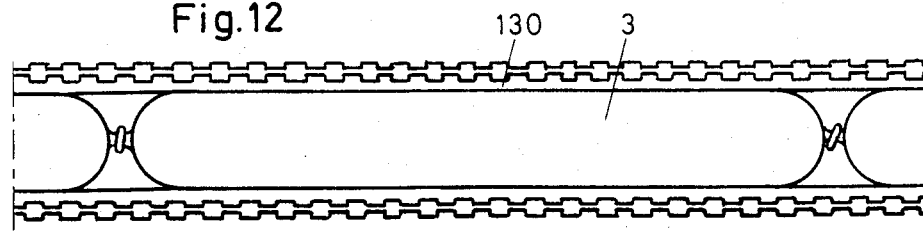

Different designs for the conveyer belts 8, 9, 19 are shown in the FIGS. 10 to 12. They can have, for example, projecting nubs 128 or can be designed with saw teeth 129. It would also be possible to provide the belts with an anti-skid coating 130.

Instead of advancing the roller chains 107 by hand, this could also be done by a motor whereby the action cycle is determined by the limit switch 131 which is operated by a pin 132 on the toothed wheel 133. The gearing 134 is chosen in such a way that a full turn of the toothed wheel 133 corresponds to a cycle interval when the smoking rod 7 is completely loaded with sausage loops.

I claim:

1. Feeding machine and receiving device for apportioned sausage chains, characterized by: the feeding machine (1) having a sausage conveying device (5) with a feeding arm (6) which is driven in conically circular movements around a smoking rod (7), the conveying device being provided with endless conveyer belts (8, 9, 19) between which a sausage chain (3) can be transported from a feeding end to a discharging end, the smoking rod being clamped into the receiving device and being movable in a longitudinal direction along a center axis of the cone defined by the conically circular movement of the feeding arm, and the feeding machine and the receiving device being coupled with each other such that the conically circular movement of the feeding arm and the longitudinal movement of the smoking rod can be adjusted relative to each other.

2. Machine and device according to claim 1, wherein the sausage conveying device is pivotably connected with a machine column (46) in the area of said feeding end, and a circularly driven end of a connecting rod (48) engages in the conveying device at a distance from said feeding end.

3. Machine and device according to claim 1, wherein a hollow elbow (23) is arranged at said discharging end of the feeding arm (6) and is rotatable around the axis of said feeding arm.

4. Machine and device according to claim 1, wherein the feeding arm (6) has two double T sections (25, 27) to guide upper and lower conveyer belts (8, 19) to advance and return on opposite sides of crosspieces between shanks of said sections, with lateral guiding of the belts being effected by the shanks.

5. Machine and device according to claim 1, wherein the conveying device (5) is designed in two parts, an upper part (26) being connected with a lower part by pivoting around a center of rotation (30) in said discharging end, and whereby the distance between the lower part and the upper part is adjustable in the area of the center of rotation.

6. Machine and device according to claim 5, wherein an upper conveyer belt (8) and an upper guide rail section (27) are arranged in the upper part (26) of the conveying device, and a lower conveyer belt and a lower guide rail section (25) are arranged in the lower part of the conveying device.

7. Machine and device according to claim 4, wherein a chamber (22) is provided in the area of said discharging end in which guide and tension rollers (20, 21; 64, 65) are mounted for the conveyer belts (8, 19), said chamber (22) carrying a bearing (24) for a rotary discharge elbow (23).

8. Machine and device according to claim 1, wherein a driven main roller (15) is journaled in the area of the feeding end of the conveying device (5), said roller having a guide groove (70) for a lower conveyer belt (9) and two additional grooves (66) lateral to the guide groove to receive two driving belts (32) which, besides their driving function, serve also for the lateral guide of a sausage chain (3) introduced into the conveying device.

9. Machine and device according to claim 8, wherein an upper conveyer belt (8) extends over the entire length of the conveying device while the lower conveyer belt (8, 19) consists of two parts, one of which (19) is located in the feeding arm (6) and the other one (9) in the feeding area of the conveying device (5).

10. Machine and device according to claim 1, wherein the conveyer belts have sausage engaging projections.

11. Machine and device according to claim 2, wherein the connecting rod is driven by a motor (59) via a main transmission gear (50) having two parallel power take-off shafts (76, 80) carrying crank disks (81, 84) with adjustable crossheads (82, 85) connected with the lower part of the connecting rod (48) to produce the circular movement of the upper end of the rod.

12. Machine and device according to claim 3, wherein the drive of the elbow (23) is effected through a universal-joint shaft (56) arranged on the feeding arm (6) and which is driven by a main transmission gear (50), a flexible shaft (51) and an auxiliary transmission gear (52) on the feeding arm (6).

13. machine and device according to claim 1, wherein a connecting shaft (80) driven by a main transmission gear (50) in the machine is connected to the receiving device.

14. Machine and device according to claim 12, wherein the drive of the elbow (23), of a connecting shaft (80) and of the conically circular movement of the conveying device (5) is effected by a common motor (59) with a common main transmission gear (50).

15. Machine and device according to claim 14, wherein a disconnectable handwheel (124) engageable with the main transmission gear is provided to adjust the development of the movements.

16. Machine and device according to claim 1, wherein the receiving device (2) has a rotary worm conveyer (99) into which a cam (111) of a rod holder (112) can be introduced for longitudinally moving the smoking rod (7).

17. Machine and device according to claim 16, wherein the receiving device has several parallel slide rails (110) fastened to two parallel roller chains (107)

arranged transversely, and a rod holder (112) rests in a movable manner in each slide rail (110) whereby only the rod holder of the smoking rod to be moved engages the worm conveyer.

18. Machine and device according to claim 17, wherein the slide rails (110) can be moved step-by-step transversely to the smoking rod (7) and the rod holders (112) are movable with the movement of the slide rails (110) in the direction of the feeding machine by a diagonally arranged guide bar.

* * * * *